United States Patent [19]
Sproul

[11] 3,752,224
[45] Aug. 14, 1973

[54] JACKET COOLED HEADER AIR DISTRIBUTION SYSTEM FOR FLUIDIZED BED REACTOR

[75] Inventor: David Douglas Sproul, Villa Park, Ill.

[73] Assignee: Chicago Bridge & Iron Company, Oak Brook, Ill.

[22] Filed: Sept. 21, 1971

[21] Appl. No.: 182,378

[52] U.S. Cl............. 165/47, 34/57 R, 23/288 S, 110/8 R, 239/132.5, 431/160, 431/166, 431/170, 285/41
[51] Int. Cl.............................. F27b 15/00
[58] Field of Search............ 431/7, 170, 161, 431/166, 160; 110/8 R; 122/4 D; 263/21 A; 23/288 S; 165/47; 239/132.5; 34/57 R

[56] References Cited
UNITED STATES PATENTS

| | | |
|---|---|---|
| 2,388,177 | 10/1945 | Patterson et al.................. 285/41 X |
| 1,965,465 | 7/1934 | Magowan.......................... 239/132.5 |
| 2,498,924 | 2/1950 | Keller ................................ 285/41 X |
| 2,582,577 | 1/1952 | Zink et al. ........................ 239/132.5 |

FOREIGN PATENTS OR APPLICATIONS

| | | |
|---|---|---|
| 606,367 | 11/1934 | Germany .......................... 239/132.5 |
| 826,978 | 1/1960 | Great Britain..................... 23/288 S |

*Primary Examiner*—Albert W. Davis, Jr.
*Attorney*—Charles J. Merriam, Basil P. Mann et al.

[57] ABSTRACT

An internally insulated enclosed metal walled reactor having a plurality of air distribution pipes extending from an air manifold header to inside a bottom portion of the reactor, a jacket tube closed at each end surrounding each air distribution pipe and projecting through, and joined to, the reactor metal wall and means to circulate a cooling fluid through each jacket tube to control heat transfer from the air distribution pipes to the reactor metal wall.

5 Claims, 8 Drawing Figures

Patented Aug. 14, 1973

INVENTOR
DAVID DOUGLAS SPROUL

BY Merriam, Marshall, Shapiro & Klose

ATTORNEYS.

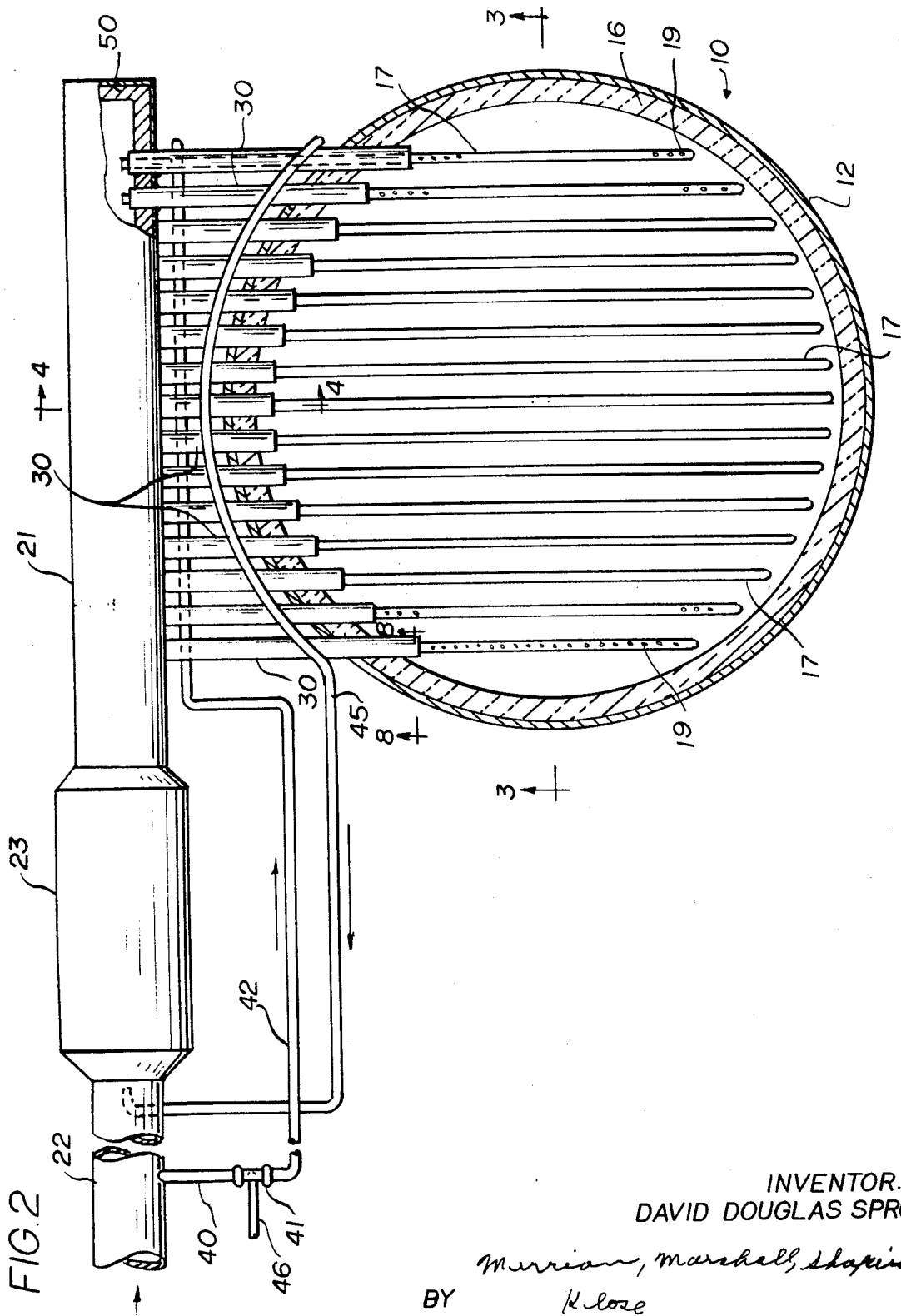

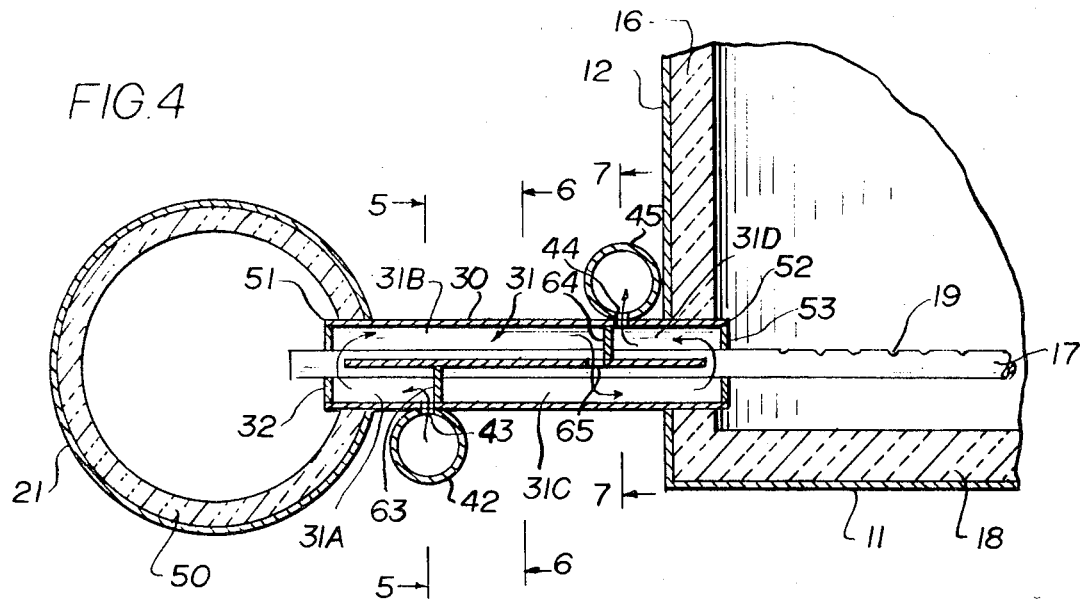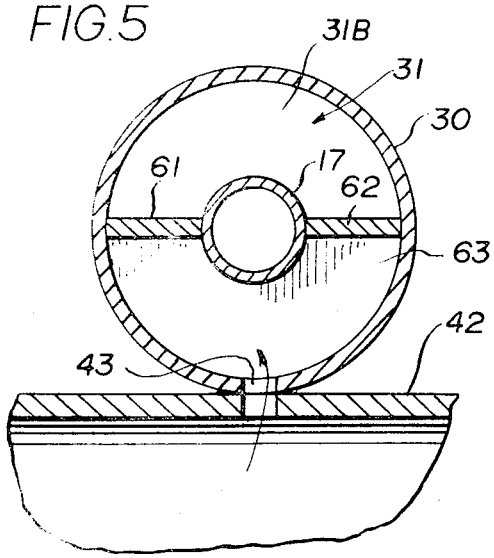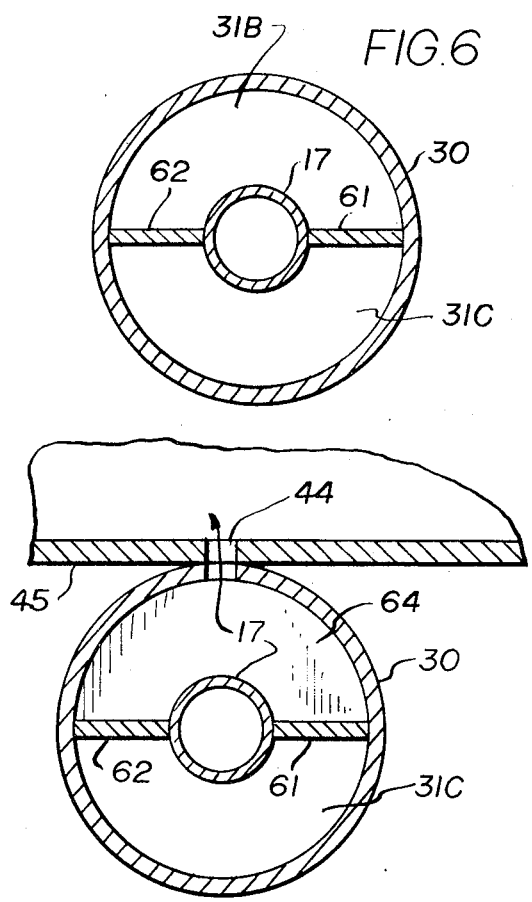

JACKET COOLED HEADER AIR DISTRIBUTION SYSTEM FOR FLUIDIZED BED REACTOR

This invention relates to reactors of the enclosed vessel type and apparatus used in association therewith. More particularly, this invention is concerned with improvements in apparatus for supplying a fluid material into a reactor.

Reactors of the enclsoed vessel type are widely used in the processing and treatment of many materials. The reactor is quite often made of at least a metal shell. When high temperatures are involved in the processing operation, it is conventional to insulate the interior walls of the reactor.

It is desirable and often essential for a fluid material to be fed uniformly into the internal bottom portion of a reactor. For example, in one type of fluidized bed reactor, a constriction plate is positioned internally above the reactor bottom to thereby define an air box to which air under pressure is fed. The air then flows through nozzles or other suitable openings in the constriction plate at a velocity sufficiently high to fluidize a particular bed located above the constriction plate.

Another type of fluidized bed reactor utilizes a plurality of air distribution pipes located in the interior bottom portion of the reactor. A gas, usually air under pressure, is then fed through the air distribution pipes and out suitably dimensioned holes in the pipes. While the term "air distribution pipes" is used, it should be understood that the term includes distribution pipes used for distributing other gases and even liquids. The air flows at sufficient velocity to fluidize a particulate bed in the reactor.

The air distribution pipes employed in a reactor of the type just described normally extend from outside of the reactor into the lower interior portion thereof. This requires that they project through both the exterior metal shell of the reactor and the internal insulation. The air which is fed to the reactor by the air distribution pipes is quite often preheated to temperatures of about 1,000°F. or thereabouts. Since the air distribution pipes are in contact with the reactor metal shell, there is substantial heating of the metal shell. Such heating of the reactor metal shell is particularly undesirable when low carbon steel is used for the shell because elevated temperatures of about 1,000°F. have a very undesirable effect on the metal. The temperature of the shell can very readily go above the temperature tolerable limits for carbon steel and thereby lead to an unsafe condition. There accordingly exists a need for improvements in reactor apparatus which employs air distribution pipes to avoid excessive heating of the exterior metal shell during processing operations.

According to the present invention there is provided improvements in reactors which employ air distribution pipes, and auxiliary equipment associated therewith, which permits adequate control of heat transfer from the air distribution pipes to the reactor exterior metal shell for the purpose of preventing the metal shell from exceeding temperature tolerable limits for the particular metal of which it is constructed.

More specifically, there is provided by the subject invention apparatus which comprises an internally insulated enclosed metal walled reactor which has a plurality of air distribution pipes extending from and communicating with an air manifold header located outside of the reactor and projecting inside to a bottom portion of the reactor, a jacket tube closed at each end spaced from and surrounding each air distribution pipe and projecting through and joined to the reactor metal wall, and means to circulate a cooling fluid through each jacket tube to control heat transfer from the air distribution pipes to the reactor metal wall.

The jacket tubes of the described apparatus are advisably joined to the manifold header. In addition, the means to circulate cooling fluid through each jacket advisably comprises at least one fluid inlet conduit in communication with each jacket, and at least one fluid outlet conduit in communication with each jacket. Furthermore, it is considered most economical for the same conduit to feed cooling fluid to each of the jackets and for a different, but the same, conduit to be placed in communication with each jacket to remove the circulating cooling fluid.

The invention will now be described further in conjunction with the attached drawings in which:

FIG. 2 is a plan view, partially in section, of the reactor and auxiliary apparatus shown in FIG. 1;

FIG. 4 is a vertical sectional view taken along the line 4—4 of FIG. 2 and shows a jacket tube, internally baffled, positioned around an air distribution pipe;

FIG. 5 is a vertical sectional view along the line 5—5 of FIG. 4;

FIG. 6 is a vertical sectional view taken along the line 6—6 of FIG. 4;

FIG. 7 is a vertical sectional view taken along the line 7—7 of FIG. 4; and

So far as is practical, the same elements or parts which appear in the different figures of the drawings will be identified by the same numbers.

Figure 1:
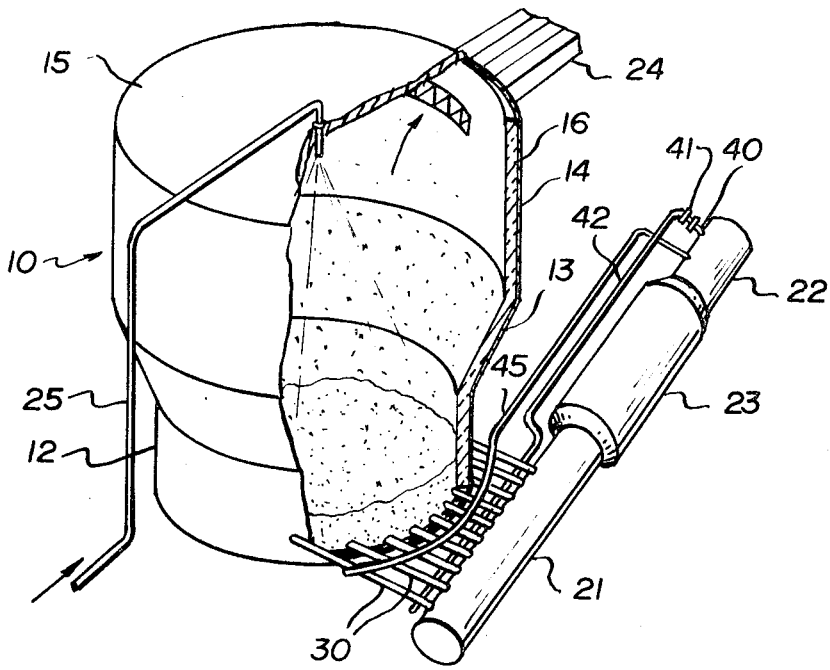
FIG. 1 is an isometric view, partially broken away, of a fluidized bed reactor having a plurality of air distribution pipes for supplying a fluidizing gas to the reactor.
Figure 8:
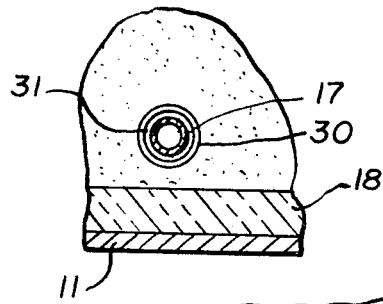
FIG. 8 is a vertical sectional view taken along the line 8—8 of FIG. 2.
Figure 3:
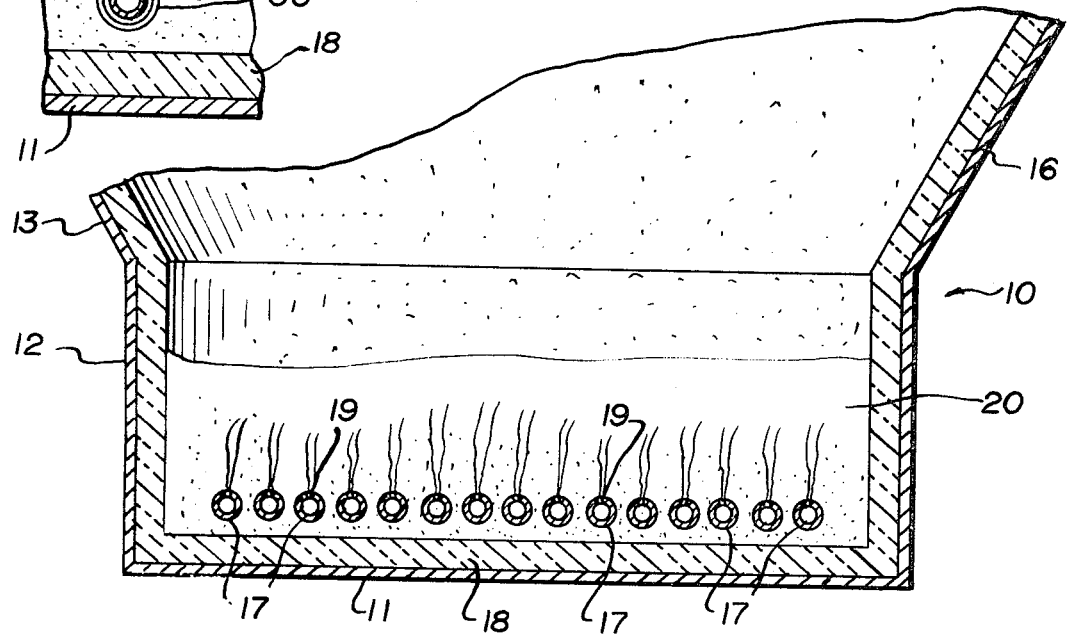
FIG. 3 is a vertical sectional view taken along the line 3—3 of FIG. 2 and shows the bottom interior portion of the reactor.

As shown in the drawings with particular reference to FIGS. 1, 2 and 3, reactor 10 has an external metal shell composed of metal bottom 11, a vertical circular cylindrical portion 12, a conical portion 13, a vertical circular cylindrical portion 14 and a top 15. It should be understood that the shape of the reactor is a matter of choice and is not the area of novelty of this invention. All of the reactor shell portions just identified are made of metal plate and usually of low carbon steel. The reactor metal shell can be readily fabricated from carbon steel plate by suitable fabricating techniques. The sections can be readily joined together by welding to complete the shell. The internal surface of the metal shell is advisably lined with insulation 16 to protect the metal shell against the internal high temperatures involved in processing operations.

A plurality of air distribution pipes 17 positioned parallel to one another are placed horizontally in the lower portion of the reactor 10 and advisably are placed so as to rest on particles of fluid bed 20 which are undisturbed during process use of the reactor. The undisturbed particles rest on insulation 18 placed on the metal shell bottom 11. The air distribution pipes 17 are provided with a plurality of suitably positioned holes 19, which may be vertical, angled or horizontal, in order for air or some other fluid to flow therefrom as required by the intended processing operation. The holes are sized so as to prevent the bed particles from passing through them into the pipes, or suitable baffles or nozzles can be used to keep out the particles. The reactor as shown in the drawings is intended for fluidized bed operations and therefore the fluid which is ejected from the holes or ports 19 will normally be air or a mixture of air with a suitable hydrocarbon gaseous fuel. The air or gas mixture expelled from the openings 19 result in fluidization of the particulate bed 20 provided in the reactor.

Air distribution pipes 17 advisably project through the reactor insulation 16 and the metal shell portion 12 as shown in FIGS. 2 and 4. The outer ends of air distribution pipes 17 communicate with the interior of air header 21 which has insulation 50 therein. Air feed supply conduit 22 communicates with preheater 23 and feeds compressed air thereto. The hot compressed air is fed from preheater 23 to air manifold header 21 from which it is distributed to the reactor by air distribution pipes 17.

Duct 24 (FIG. 1) communicates with the reactor upper interior space and removes gases and other products from the reactor. Pipe 25 can feed a suitable material to be processed into the reactor. For example, the material fed to the reactor can be a waste liquor from wood pulping operations containing about 25 to 35 percent solids. Such a feed can be burned autogenously in such a fluidized bed reactor. In addition, sludge from sewage treatment plants can also be fed into such a reactor for disposal by burning although with such a feed stream it may be necessary to supply additional heat by means of an auxiliary fuel.

Surrounding each air distribution tube 17, at least where it penetrates the reactor metal shell and internal insulation, is a jacket tube 30 as shown in FIGS. 2 and 4 to 8. Each jacket tube 30 is slightly larger internally than the air distribution pipe 17 which it surrounds to thereby provide a path 31 for a cooling fluid to flow around that portion of the air distribution pipe which is surrounded by the jacket tube. The inner end 51 (FIG. 4) of jacket tube 30 extends into header 21 beyond the inner surface of insulation 50 and is closed by plate 32 through which air distribution tube 17 projects into the interior of header 21. The outer end 52 of jacket tube 30 projects into the interior of the reactor through shell 12 and insulation 16 and is closed at its end by plate 53 which surrounds air distribution tube 17.

Conduit 40 (FIG. 2) communicates with air feed supply conduit 22. Cooling fluid, usually air, is withdrawn from air feed supply conduit 22 by conduit 40 and then by suction of ejector 41 is fed to conduit 42. High pressure air or other fluid is supplied to ejector 41 by conduit 46 as the motive stream for operation of the ejector. The cooling fluid is conveyed by conduit 42 to each of jacket tubes 30. Cooling fluid flows from pipe 42 through a common hole or port 43 therein and in the jacket 30 and thus into the path 31 between each air distribution pipe 17 and the internal surface of the surrounding jacket tube 30. The cooling fluid picks up heat through heat transfer with air distribution pipe 17. The hot fluid is removed from jacket tube 30 through hole 44 by conduit 45 which returns the heated fluid to feed supply conduit 22 at a location downstream from the location where conduit 40 removes fluid from the feed supply conduit 22. The heated fluid is thus sent by conduit 45 into the supply stream fed to preheater 23 already preheated so that its heat capacity is thereby utilized in the system.

Each of jacket tubes 30 can be internally baffled, if advisable, to achieve a proper flow of cooling fluid around the air distribution pipe passing therethrough to prevent overheating, particularly where the jacket tubes join the reactor shell 12 and header 21. FIGS. 4 to 7 illustrate one system of baffles suitable for this purpose. Positioned horizontally and axially to air distribution tube 17 is a pair of baffle plates 61 and 62. These baffle plates extend laterally from, and are joined to, air distribution tube 17, into contact with the inside of jacket 30 to which they are joined. Baffle plates 61 and 62 terminate before jacket end plates 51 and 53 thereby provide flow paths for cooling fluid at each end of jacket 30. A vertical, generally semi-circular baffle plate 63 extends from baffles 61 and 62 and the surface of air distribution tube 17 to the internal surface of jacket 30. Baffle 63 is placed on the reactor side of hole 43 so that cooling fluid from hole 43 flows into space 31A, around the end of baffles 61 and 62, and into space 31B. Another vertical baffle 64, like baffle 63, is placed above baffles 61 and 62. Holes 65, formed by leaving a gap in baffles 61 and 62, provide a path for cooling fluid to flow from space 31B to space 31C from which the cooling fluid flows around the ends of plates 61 and 62 to space 31D and from it out hole 44. It should be understood that spaces 31A, 31B, 31C and 31D combined comprise space 31 when no baffles are in the jacket.

The described cooling apparatus and system prevents the reactor metal shell, as well as header 21, from overheating even when very hot air, or some other gas, flows through the air distribution pipes. The cooling fluid is directed through the cooling jacket where the jacket joins the reactor shell and the header and thus controls heat transfer from the air distribution pipe thereto. The apparatus makes possible the safe use of a low carbon steel shell for the reactor and the header by preventing them from reaching unsafe temperatures. The use of the cooling jackets also makes it safer for workmen to move about the exterior of the reactor since the hot air distribution pipes are effectively covered and out of contact. The air preheater and header can of course be insulated for safety and heat retaining reasons.

The foregoing detailed description has been given for clearness of understanding only, and no unnecessary limitations should be understood therefrom as modifications will be obvious to those skilled in the art.

What is claimed is:

1. A fluidized bed reactor system comprising:
an internally insulated enclosed metal walled reactor;
a plurality of air distribution pipes for supplying fluidizing air to said reactor, said pipes extending from and communicating with an air manifold header, outside of the reactor, to inside a bottom portion of the reactor;
conduit means for supplying fluidizing air to said air manifold header;
preheater means in said conduit means for preheating the air supplied by said conduit means to said air manifold header;
a jacket tube closed at each end spaced from and surrounding each air distribution pipe and projecting through, and joined to, the reactor metal wall; and means to pass a stream of cooling air through each jacket tube to control heat transfer from the air distribution pipes to the reactor metal wall, said stream being taken from said conduit at a point upstream of said preheater and being returned to said conduit at a point between said preheater and said supply point.

2. Apparatus according to claim 1 in which the jacket tubes are joined to the manifold header.

3. Apparatus according to claim 1 in which the means to circulate cooling fluid through each jacket comprises at least one inlet conduit which communicates with each jacket, and at least one outlet conduit which communicates with each jacket.

4. Apparatus according to claim 3 in which the same inlet conduit, and the same outlet conduit, communicates with each jacket tube.

5. Apparatus according to claim 1 in which the jacket tube is internally baffled to direct flow of cooling fluid to each internal end of the jacket tube.

* * * * *